US012519569B2

(12) United States Patent
Van Der Tuijn et al.

(10) Patent No.: US 12,519,569 B2
(45) Date of Patent: *Jan. 6, 2026

(54) CONTROL METHOD AND SYSTEM FOR COMMUNICATION RECEIVER

(71) Applicant: STMicroelectronics International N.V., Geneva (CH)

(72) Inventors: Roland Van Der Tuijn, Mouans-Sartoux (FR); Christophe Arnal, St Vallier de Thiey (FR)

(73) Assignee: STMicroelectronics International N.V., Geneva (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/601,381

(22) Filed: Mar. 11, 2024

(65) Prior Publication Data

US 2024/0333431 A1    Oct. 3, 2024

(30) Foreign Application Priority Data

Mar. 30, 2023   (FR) ...................................... 2303077

(51) Int. Cl.
*H04L 1/18*       (2023.01)
*H04L 1/1607*    (2023.01)
*H04L 5/00*       (2006.01)

(52) U.S. Cl.
CPC .......... *H04L 1/1657* (2013.01); *H04L 5/0055* (2013.01)

(58) Field of Classification Search
None
See application file for complete search history.

(56) References Cited

U.S. PATENT DOCUMENTS

| | | | |
|---|---|---|---|
| 8,483,624 B2* | 7/2013 | Cai | H04L 1/18 370/473 |
| 10,064,133 B2 | 8/2018 | Berntsen et al. | |
| 2003/0063691 A1* | 4/2003 | Shiozawa | H04W 52/0225 375/340 |
| 2005/0135248 A1* | 6/2005 | Ahuja | H04L 47/28 370/235 |
| 2012/0220228 A1* | 8/2012 | Tandai | H04W 76/10 455/41.1 |
| 2013/0114448 A1* | 5/2013 | Koo | H04L 1/0009 370/252 |
| 2014/0098761 A1 | 4/2014 | Lee et al. | |
| 2017/0310628 A1* | 10/2017 | Norwood | H04L 51/234 |
| 2019/0222970 A1 | 7/2019 | Shan et al. | |

* cited by examiner

*Primary Examiner* — Mujtaba M Chaudry
(74) *Attorney, Agent, or Firm* — Slater Matsil LLP

(57) ABSTRACT

A method of controlling a receiver of communications includes data packets being transmitted at constant intervals, and circuits of the receiver being, in each interval, set to standby between the correct reception of at least one data packet and a time preceding the beginning of the next interval.

23 Claims, 4 Drawing Sheets

CONTROL METHOD AND SYSTEM FOR COMMUNICATION RECEIVER

CROSS-REFERENCE TO RELATED APPLICATIONS

This application claims the priority benefit of French patent application number FR2303077, filed on Mar. 30, 2023, entitled "Procédé de commande de récepteur de communications," which is hereby incorporated herein by reference to the maximum extent allowable by law.

TECHNICAL FIELD

The present disclosure generally concerns methods for controlling communication, such as radiofrequency, low frequency, wired or even acoustic communications, receivers as well as communication receivers and systems working with such frequencies.

BACKGROUND

Communications between a transmitter and a receiver may be unstable. Usual communication protocols thus provide the repeated sending of a same data packet by the transmitter until it is received by the receiver.

Current protocols, however, cause a significant energy usage from the receiver.

SUMMARY

There is a need to improve communication methods and receivers.

There is a need to obtain a communication method enabling to limit the usage of the receivers as well as receivers and systems implementing such a method.

An embodiment overcomes all or part of the disadvantages of known methods.

One embodiment provides a method of controlling a receiver of radio frequency communications where data packets are transmitted at constant intervals, wherein circuits of the receiver are, in each interval, set to standby between the correct reception of a data packet and a time preceding the beginning of the next interval.

One embodiment provides a receiver of radio frequency communications where data packets are transmitted at constant intervals, wherein circuits of the receiver are, in each interval, set to standby between the correct reception of a data packet and a time preceding the beginning of the next interval.

According to an embodiment, the standby time period is calculated from an acknowledgement of receipt transmitted by the receiver.

According to an embodiment, the standby time period is a function of a protocol data unit of the data packet.

According to an embodiment, the standby time period is a function of a maximum authorized length of the protocol data unit.

According to an embodiment, the standby time period is a function of a predetermined time range of transmission of the data packet.

According to an embodiment, the standby time period is a function of a predetermined time range of reception of an acknowledgement of receipt.

According to an embodiment, the standby time period depends on a maximum authorized number of times that a same data packet can be sent per interval.

According to an embodiment, the time preceding the beginning of the next interval is a time linked to a clock frequency of the receiver and wherein the standby time period depends on the time preceding the beginning of the next interval.

According to an embodiment, the standby time period is the same for all the intervals in which the receiver has correctly received the data packet.

According to an embodiment, the standby time period is different for different intervals.

According to an embodiment, the time preceding the beginning of the next interval is a time linked to a clock frequency of the receiver.

According to an embodiment, the reception of a data packet is ensured by a packet reception module and a sending of an acknowledgement of receipt linked to the correct reception of the packet is ensured by a transmission module, the reception module and the transmission module being coupled, alternatively, to an antenna via a switch.

An embodiment provides a communication system comprising a first communication module configured to transmit data packets at constant intervals, and a second module comprising a receiver as described above.

According to an embodiment, the time preceding the beginning of the next interval is a time linked to a clock frequency of the receiver and to a clock frequency of the first module.

According to an embodiment, the standby time period is a function of data representative of a number of retransmissions of the same packet.

According to an embodiment, at least one data packet comprises data representative of a number of retransmissions of the packet.

According to an embodiment, the communication system comprises several communication transmitter modules, wherein some circuits of the receiver are, within each interval, in a standby state between the valid reception of at least one data packet of each communication transmitter modules and the time preceding the beginning of the following interval.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made, unless specified otherwise, to the orientation of the figures.

Unless specified otherwise, the expressions "around," "approximately," "substantially" and "in the order of" signify within 10%, and preferably within 5%.

Figure 1:
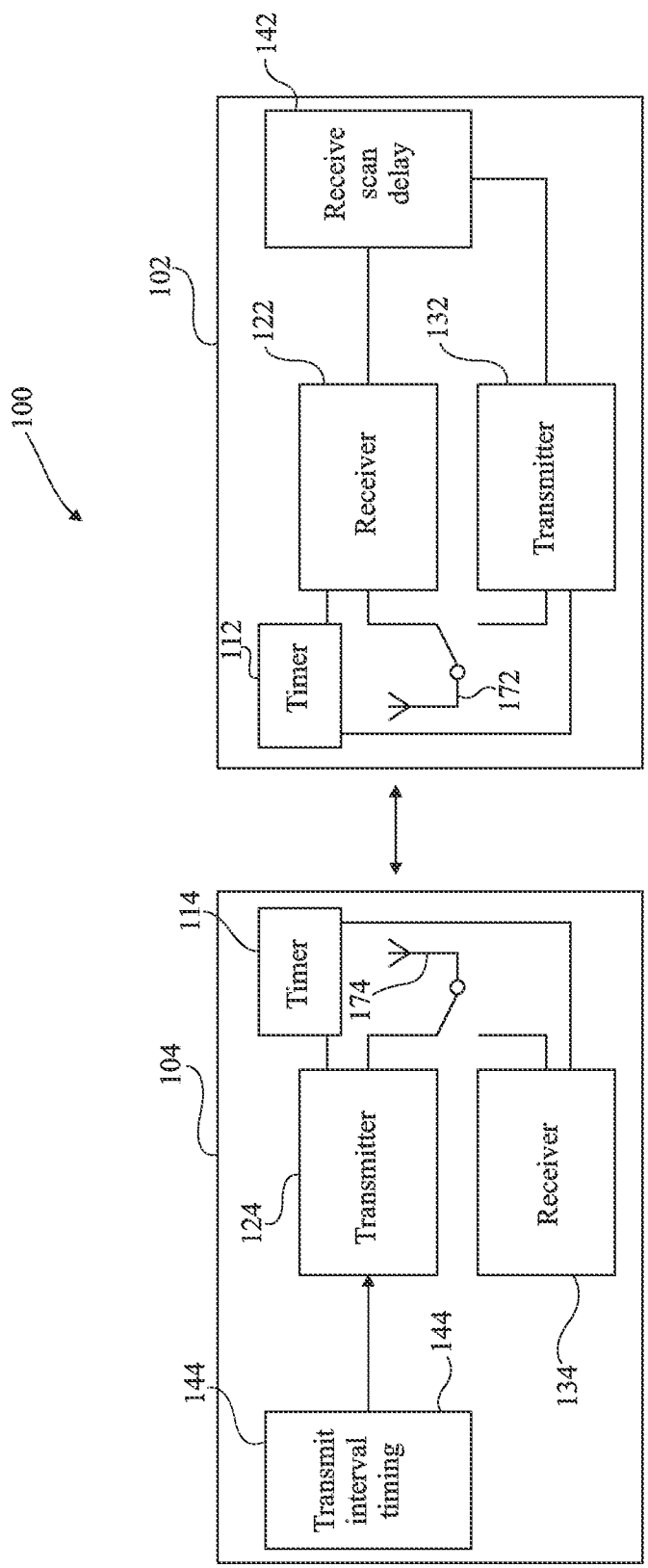
FIG. 1 very schematically shows an example of a communication system of the type to which the described embodiments apply.

FIG. 1 very schematically shows an example of a communication system of the type to which the described embodiments apply.

System 100 comprises a first 104 and a second 102 communication modules configured to exchange data in bidirectional fashion.

In the shown example, module 102 and module 104 are each configured to be used either in a data transmission mode or in a data reception mode. However, it is possible to envisage for one of the modules to only be a data transmitter, in the sense that it is the one that sends communication data packets, and for the other module to only be a data receiver in the sense that it receives the data packets and only sends acknowledgements of receipt or non-acknowledgements. Although the shown example shows a single transmitter module and a single receiver module, the skilled person may use his or her knowledge to adapt this description in the event that multiple transmitter modules are intended to communicate with a single transmitter module.

In the present disclosure, the transmitted data are indifferently called "data" and "data packets."

Module 102 and module 104 each comprise a signal transmission block 132 (Transmitter), respectively 124, a signal reception block 122 (Receiver), respectively 134, both coupled to an antenna 172, respectively 174 via a switch coupling the antenna, now to the transmission block, now to the reception block. The respective transmission and reception blocks of each module are for example coupled to a time counter (TIMER) 112, 114 enabling among others to synchronize them or also to count the different times allocated to each data transmission frame, such as provided by the implemented protocol. When one of the two modules is placed in data transmission mode, the other is placed in a data reception mode, or scan mode before reception of the data.

In one example, by default, the module that is in data transmitter mode waits for a command to transmit data and the module that is in data receiver mode is in a data receive or listen mode. In another example, by default, both modules are in either a data receive or listen mode. When one of the two modules wants to transmit data, it is switched to data transmission mode.

The implemented radio frequency communication protocol comprises the sending of successive frames, otherwise called intervals, of constant duration defined for example by a block 144 (Transmit interval timing). In the shown example, data packets are transmitted at least once at the beginning of each frame so that regular intervals separate the sending of these packets.

The data packets contain, in addition to the data, for example data control elements such as a cyclic redundancy code (CRC) or a check sum. The data packets for example comprise a protocol data unit (PDU).

In an example, for a given frame, the transmitter module for example sends a data packet for a transmission time range (Ttransmission) defined by the communication protocol. The transmitter then sets to a reception mode for a reception time range (Treception) where it waits for an acknowledgement of receipt or a non-acknowledgement. During the transmission time range, the receiver module is in reception mode and if it correctly receives this data packet, it stores, and possibly analyzes, the received data packet then returns an acknowledgement of receipt for a transmission time range. If this acknowledgement of receipt is received by the transmitter module, then the transmitter module will wait for the end of the frame (in other words the interval) to proceed to a new frame. While waiting for the data packet of the new frame, the receiver module remains in a scan mode for a scan time range (Tscantime) which consumes energy.

In another example, for a given frame, the transmitter module for example sends a data packet during the transmission time range. Meanwhile, the receiver unit which is in scan mode, if it correctly receives the sent data packet, sends an acknowledgement of receipt. If, however, the reception of the data packet is not correct, for example, by corruption of the data packet, a non-acknowledgement is returned. If the acknowledgement of receipt is this time not received by the transmitter module or if the non-acknowledgement is received by the transmitter, then the transmitter module will return the data packet already previously sent for a second transmission range but always within the same frame, and will then set to the reception mode, and so on until it receives an acknowledgement of receipt. However, the communication protocol may provide a maximum number of possible ranges in a same frame for the transmitter to return a same data packet.

In the above examples, the receiver sets to the scan mode systematically after it has sent an acknowledgement of receipt or a non-acknowledgement and this, until the reception of a data packet. This however causes a significant activity level at the level of the receiver while, in the case where an acknowledgement of receipt has already been sent by the receiver sufficiently soon before the end of the frame, the scan mode is really necessary only little before the beginning of the new frame where a new data packet is sent.

According to the described embodiments, it is provided to implement a setting to standby of the receiver circuits in each interval, between the correct reception of a data packet and a time preceding the beginning of the next interval. The energy consumption at the level of the receiver is thus considerably decreased.

Figure 2:
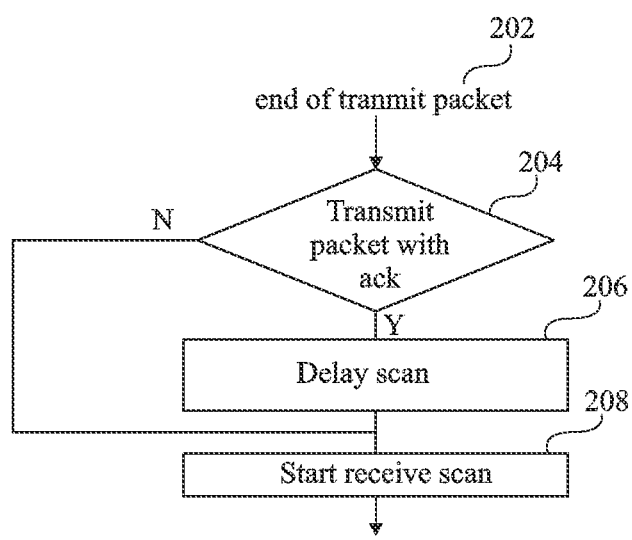
FIG. 2 shows, in the form of a flowchart, an implementation mode of a communication method.

FIG. 2 shows, in the form of a flowchart, an implementation mode of a communication method.

After the sending of a data packet (end of transmit packet), a step 204 (Transmit packet with ack) of the control method is implemented.

If the data packet is correctly received and an acknowledgement of receipt is sent by the receiver, then branch "Y" is taken and the method proceeds to step 206 (delay scan). In the case where several transmitters are provided for a single receiver then the receiver will be able to send an acknowledgment when, for example, a data packet from each of the transmitters has been successfully received. At step 206, all or part of the circuits of the receiver are deactivated for a standby time period (Tdelaytoscan) for example predetermined, and this, until a time of the interval, in other words of the frame, where the scan mode is implemented for the reception of a packet of a new frame. The implementation of the scan mode corresponds to a step 208 (Start receive scan). In the scan mode, circuits of the receiver or the entire receiver are activated to detect and enable to receive data originating from the transmitter. According to the number of packets sent by the transmitter in a frame before the data packet is correctly received and an acknowledgement of receipt is sent by the receiver, the time when the scan mode is implemented may vary from one frame to the other. For example, for a given interval, if it is necessary to send a same data packet a plurality of times before an acknowledgement of receipt is received by the transmitter, then the time when the scan mode is implemented is longer than in the case where an acknowledgement of receipt is sent as soon as the first sending of the data packet.

The standby time period is for example predetermined and constant for each frame where the receiver has correctly received the data packet or in the event that multiple transmitters are provided for a single receiver for each frame where a data packet from each of the transmitters will have been successfully received. The standby time period is for example predetermined according to the durations selected in the communication protocol for the ranges of data reception and of sending of acknowledgments of receipt of the receiver. In an example, the standby time period is for example predetermined according to a minimum time (Tscantimemini) necessary for the activation of the scan mode and/or to overcome synchronization errors, expressed in parts per million, of the clocks of the transmitter and/or of the receiver. The standby time period is further for example predetermined according to the number Nb of possible transmission ranges provided by the protocol for sending of a same packet within a same frame by the transmitter. The standby time period is further for example predetermined according to the number of possible reception ranges provided by the protocol for the reception of an acknowledgement of receipt.

The standby time period is, in an example, predetermined with the following equation:

$$T\text{delaytoscan} = T\text{transmitinterval} - Nb*(T\text{transmission} + T\text{reception}) - T\text{scantimemini}$$ [Equation 1]

In the example of equation 1, when Nb=2, then the standby time period is maximum, and thus energy savings over the operation of the receiver are maximized.

To give a possible order of magnitude of the standby time period, frames Ttransmitinterval for example last for 10 milliseconds, number Nb is for example 2, Ttransmission and Treception are for example 500 us and for example Tscantimemini is 10 μs.

When the standby time period and the duration of the frames are defined as constant in the protocol, then the scan time (Tscantime), which is implemented after a non-acknowledgement or once the standby time period is over and before the next frame, may vary from one frame to the other according to the time of the frame when an acknowledgement of receipt is sent by the receiver.

If the data packet is not correctly received at step 204, for example as a result of a data corruption, then branch "N" is taken until step 208 when the receiver scan mode is implemented.

In an optional example, the transmitter is configured to add a data, for example, one or several bits, to the transmitted data packet, to count how many times a same packet has been retransmitted along the successive re-sendings as a result of the lack of reception of an acknowledgement of receipt.

This enables to more precisely determine the free space remaining in the frame.

The number Nb is, in another example, the number of retransmissions that were required. This makes it possible to use a higher standby time (Tdelaytoscan) in cases where the communication is of good quality.

In yet another example, in equation 1, the number Nb is replaced by the value read in the +2 field. This makes it possible to address the case where Nb is encoded on only one bit while the number of retransmissions is 4 for example.

In general, the skilled person will be able to use any means of his or her knowledge to determine the number of retransmissions in order to optimize the standby time.

Figure 3:
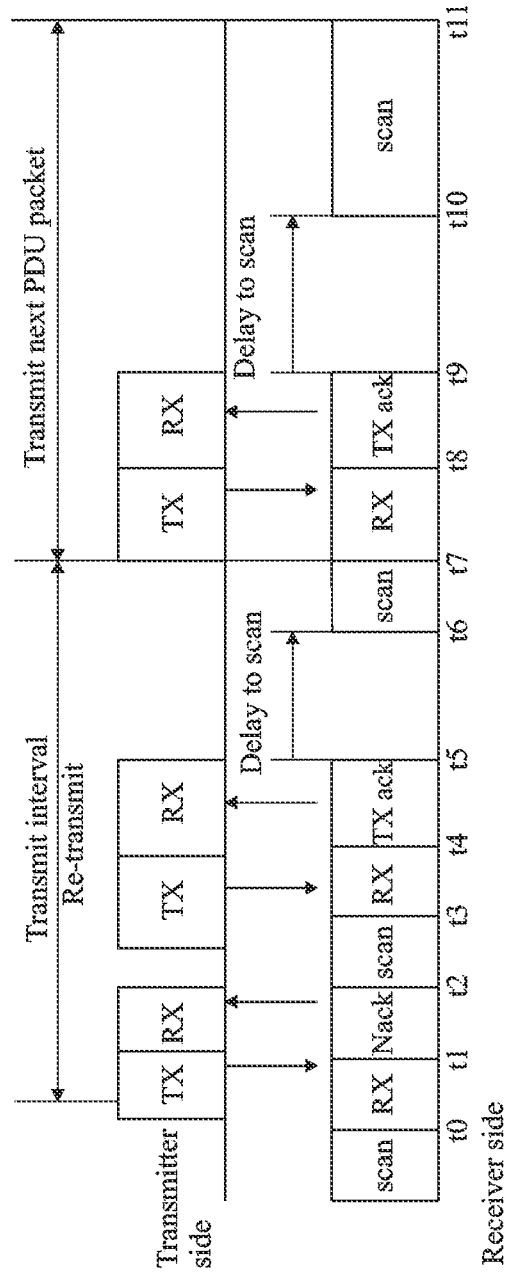
FIG. 3 shows a timing diagram of a communication method according to an embodiment.

FIG. 3 shows a timing diagram of a communication method according to an embodiment. More precisely, FIG. 3 shows an example of a communication between two communication modules (Transmitter side, Receiver side).

The example of FIG. 3 shows two successive frames (in other words two intervals). In reality, a much higher number of frames follow one another in a real communication.

Before a time t0 corresponding to the starting of a first interval, the receiver module (Receiver side) is in scan mode. At time t0, the first interval starts by the sending of the first data packet during a defined transmission range (TX) until a subsequent time t1, which also corresponds to the reception range (RX) of the receiver. In a period between time t1 and a subsequent time t2, which corresponds to a transmission range of the receiver defined for the sending of an acknowledgement of receipt or of a non-acknowledgement, a non-acknowledgement (Nack) is sent by the receiver to signify that (as well as in the whole text), in the reception range (here RX located between times t0 and t1), a data packet has been received, but with errors. The period between times t1 and t2 corresponds, on the transmitter side, to a reception (RX) or scan range, where the transmitter awaits an acknowledgement of receipt or a non-acknowledgement. In the shown example, the acknowledgement of receipt is received. In this case, after a period between time t2 and a subsequent time t3, where no action is provided, the transmitter implements a new sending of the data packet with a new transmission range (TX) between time t3 and a subsequent time t4. Between times t2 and t3, since no acknowledgement of receipt has been sent by the receiver in the range provided between times t1 and t2, the receiver sets to the scan mode after the sending of the non-acknowledgement Nack. In a second reception range (RX) between times t3 and t4, the receiver receives the packet which has been sent (Re-transmit) for the second time in the frame (Transmit interval). In the shown example, the packet is correctly received and the receiver then returns in a range (TX ack), located between time t4 and a subsequent time t5, an acknowledgement of receipt. The transmitter receives between times t4 and t5 (RX) the acknowledgement of receipt. The reception of the packet on the receiver side being correct, an acknowledgement of receipt has been transmitted between times t4 and t5, and all or part of the circuits of the receiver set to standby to observe a predetermined standby time period, between time t5 and a subsequent time t6 (Delay to scan). Since the acknowledgement of receipt has been received, the transmitter then no longer returns a data packet until the next frame (Transmit next PDU packet) at a subsequent time t7. Between times t6 and t7, the receiver is in scan mode to prepare to possibly receive the data packet originating from the next frame (Transmit next PDU packet).

In the frame (Transmit next PDU packet) which extends between time t7 and a subsequent time t11, the transmitter transmits a new data packet in transmission range TX between time t7 and a time t8 located between times ty and t11. During the corresponding reception range (RX), the receiver correctly receives the data packet and thus sends between time t8 and a time t9, located between times t8 and t11, an acknowledgement of receipt (TX ack) which is received by the transmitter. After the sending of the acknowledgement of receipt, all or part of the receiver circuits are set to standby for the stopping period (Delay to scan) which has been predetermined, that is between time t9 and a time t10 located between times t9 and t11. In the shown example, the standby period is the same for each frame, in other word, for each interval where the reception of the packet is correct. At time t10 and until time t11, the receiver is in scan mode while waiting for the data packet of the next frame.

Due to the standby periods of circuits of the receiver between times t5 and t6 and between times t9 and t10, the power consumption of the receiver is decreased.

Figure 4:
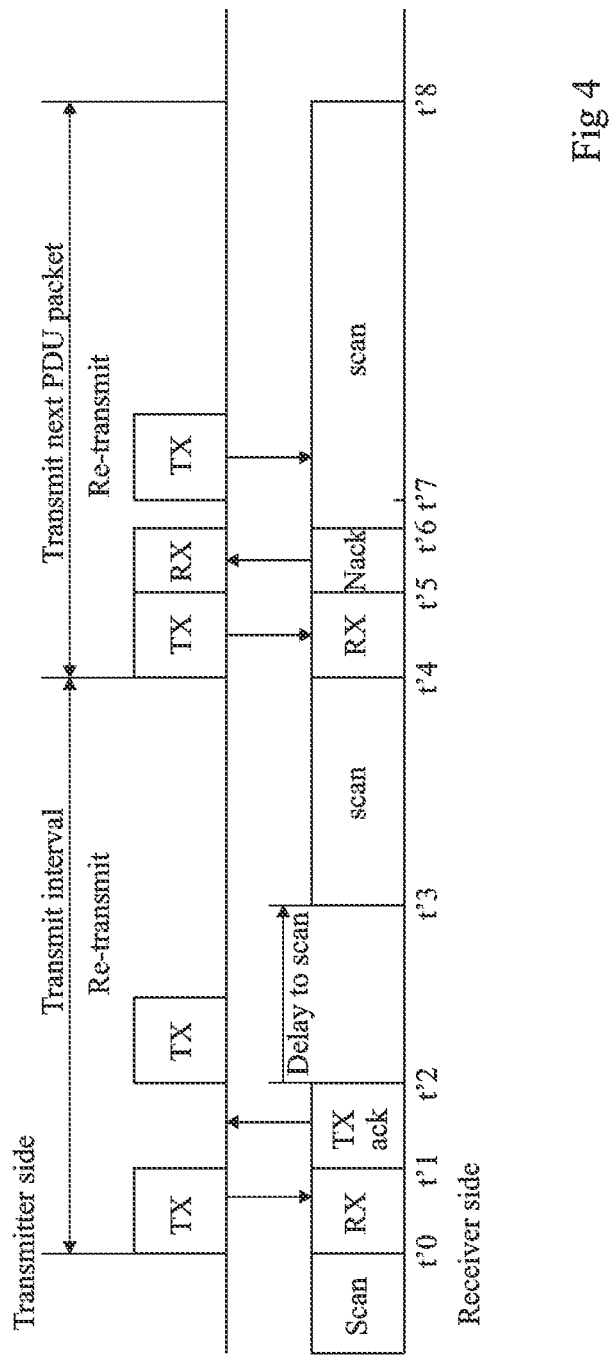
FIG. 4 shows a timing diagram of a communication method according to an embodiment.

FIG. 4 shows a timing diagram of a communication method according to another embodiment.

More particularly, the example of FIG. 4 shows two successive frames (Transmit interval and Transmit next PDU packet) respectively between a time t'0 and a subsequent time t'4 and between time t'4 and a subsequent time t'8. At each beginning of a frame (in other words, of an interval), respectively between time t'0 and a time t'1 located between times t'0 and t'4 and between time t'4 and a time t'5 located between times t'4 and t'8, the transmitter sends a data packet during a transmission range (TX).

Before time t'0, the receiver is in the scan mode. The reception of the first data packet is correctly performed, whereby an acknowledgement of receipt is sent (TX ack) in the transmission range between time t'1 and a time t'2 located between t'1 and t'4. In the illustrated example, this acknowledgement of receipt is not received by the transmitter. However, since the packet has been correctly received, and thus since an acknowledgement of receipt has been sent by the receiver, all or part of the receiver circuits are set to standby to observe a predetermined standby time between time t'2 and a time t'3 (Delay to scan) located between times t'2 and t'4. At time t'2, the transmitter, which has not received the acknowledgement of receipt though transmitted by the receiver between times t'1 and t'2, retransmits (Re-transmit) the data packet. The receiver, which is set to standby for the standby time period, then consumes no energy to try scanning and receiving the retransmitted packet, which had however already been previously received. In the following example, the transmitter only sends the data packet once per frame. After the standby time period, at a subsequent time t'3, the receiver is set to the scan mode until the next interval at time t'4.

Between times t'4 and t'5, the transmitter sends another data packet (Transmit next PDU packet), after which the receiver sends, between time t'5 and a time t'6 between times t'5 and t'8, a non-acknowledgement (Nack) since this packet has been incorrectly received. The transmitter receives this non-acknowledgement and thus, after a latency period, returns at a time t'7 (TX) located between times t'6 and t'8, the packet which has not been correctly received. A non-acknowledgement having been sent by the receiver at time t'6, the receiver sets to the scan mode waiting for a packet sent by the transmitter. In the example shown, the receiver does not receive any packets until the end of the interval at time t'8, which is subsequent to time t'7, the receiver therefore remains in listening mode at least until time t'8. The time dedicated to scan mode is longer for the second frame in comparison to the first one.

In the example of FIG. 4, the number of times that the packet is returned after a poor reception is limited to one by the protocol. The packet is thus not returned for a second time.

Various embodiments and variants have been described. Those skilled in the art will understand that certain features of these various embodiments and variants may be combined, and other variants will occur to those skilled in the art. In particular, even if the examples of FIGS. 3 and 4 only illustrate cases where a single packet resending is provided by the protocol at the transmitter level, those skilled in the art may implement a protocol where a it is possible to send a data packet several times within a same interval in case of a lack of reception of an acknowledgement. The skilled person will be able to apply his or her knowledge to implement the teaching of this description for the type of communication of his or her choice, such as wireless radio frequency communications in the order of MHz or GHz or even more, low frequencies in the order of Hz or kHz, or wired or acoustic communications.

The skilled person will be able to use the examples presented to implement other variants, such as several transmitter modules communicating with the same receiver module. In this case, the receiver circuits are delayed to scan, for example when a data packet from each of the transmitters is received correctly. The formula in equation 1 can then be used by taking into account the most restrictive conditions.

Finally, the practical implementation of the described embodiments and variations is within the abilities of those skilled in the art based on the functional indications given hereabove. In particular, as concerns the predetermination of the standby time period of all or part of the receiver circuits after the correct reception of a data packet, those skilled in the art can envisage any time value greater than zero and the value provided by equation 1. In an example, those skilled in the art may provide predetermining a plurality of values for the standby time period and implement the latter differently for different frames (in other words, for different intervals).

What is claimed is:

1. A method of controlling a receiver of communications, the method comprising:
    receiving data packets transmitted at constant intervals; and
    setting circuits of the receiver, in each interval, to a standby time period between a correct reception of at least one data packet and a time preceding a beginning of a next interval.

2. The method according to claim 1, further comprising calculating the standby time period from an acknowledgement of receipt transmitted by the receiver.

3. The method according to claim 1, wherein the standby time period is a function of a protocol data unit of the at least one data packet.

4. The method according to claim 3, wherein the standby time period is a function of a maximum authorized length of the protocol data unit.

5. The method according to claim 1, wherein the standby time period is a function of a predetermined time range of transmission of the at least one data packet.

6. The method according to claim 1, wherein the standby time period is a function of a predetermined time range of reception of an acknowledgement of receipt.

7. The method according to claim 1, wherein the standby time period depends on a maximum authorized number of times that a same data packet can be sent per interval.

8. The method according to claim 1, wherein the time preceding the beginning of the next interval is linked to a frequency of the receiver, and the standby time period depends on the time preceding the beginning of the next interval.

9. The method according to claim 1, wherein the standby time period is the same for all intervals in which the receiver has correctly received the at least one data packet.

10. The method according to claim 1, wherein the standby time period is different for different intervals.

11. The method according to claim 1, wherein the standby time period is a function of data representative of a number of retransmissions of a same packet.

12. The method according to claim 11, wherein the at least one data packet comprises the data representative of the number of retransmissions of the data packet.

13. A receiver of radio frequency communications comprising:
a receiver configured to:
receive data packets transmitted at constant intervals; and
set circuits of the receiver, in each interval, to a standby time period between a correct reception of at least one data packet and a time preceding a beginning of a next interval.

14. The receiver according to claim 13, wherein the receiver is configured to calculate the standby time period from an acknowledgement of receipt transmitted by the receiver.

15. The receiver according to claim 13, wherein the standby time period is a function of a protocol data unit of the at least one data packet.

16. The receiver according to claim 13, wherein the time preceding the beginning of the next interval is linked to a frequency of the receiver and wherein the standby time period depends on the time preceding the beginning of the next interval.

17. The receiver according to claim 13, wherein the standby time period is the same for all intervals in which the receiver has correctly received the at least one data packet.

18. The receiver according to claim 13, wherein the standby time period is different for different intervals.

19. The receiver according to claim 13, wherein the time preceding the beginning of the next interval is linked to a clock frequency of the receiver.

20. The receiver according to claim 13, further comprising:
a packet reception module ensuring the correct reception of the at least one data packet;
a transmission module ensuring a sending of an acknowledgement of receipt linked to the correct reception of the at least one data packet; and
an antenna, wherein the packet reception module and the transmission module are coupled, alternatingly, to the antenna.

21. A communication system comprising:
a first communication module configured to transmit data packets at constant intervals; and
a second communication module comprising a receiver configured to:
receive the data packets transmitted at the constant intervals; and
set circuits of the receiver, in each interval, to a standby time period between a correct reception of at least one data packet and a time preceding a beginning of a next interval.

22. The communication system according to claim 21, further comprising several communication transmitter modules, wherein some circuits of the receiver are, within each interval, in a standby state between a valid reception of at least one data packet of each communication transmitter module and the time preceding the beginning of the next interval.

23. The communication system according to claim 21, wherein the time preceding the beginning of the next interval is linked to a first clock frequency of the receiver and to a second clock frequency of the first communication module.

* * * * *